United States Patent [19]

Felps

[11] Patent Number: 4,658,341
[45] Date of Patent: Apr. 14, 1987

[54] REGULATED DC POWER SUPPLY

[75] Inventor: Jimmie D. Felps, Colorado Springs, Colo.

[73] Assignee: Hewlett Packard Company, Palo Alto, Calif.

[21] Appl. No.: 874,824

[22] Filed: Jun. 11, 1986

Related U.S. Application Data

[63] Continuation of Ser. No. 732,485, May 9, 1985, abandoned.

[51] Int. Cl.[4] .......................................... H02M 3/335
[52] U.S. Cl. ....................................... 363/21; 363/86; 323/266
[58] Field of Search ...................... 363/21, 65, 86, 89, 363/63; 323/266, 267, 268; 307/296 R, 296 A, 297

[56] References Cited

U.S. PATENT DOCUMENTS 3,571,604  3/1971  La Porta et al. ............... 323/268 X
4,419,723  12/1983  Wilson Jr. .............................. 363/21

Primary Examiner—Patrick R. Salce
Assistant Examiner—Emanuel Todd Voeltz
Attorney, Agent, or Firm—Donald N. Timbie; Jon R. Stark; Karl E. Bring

[57] ABSTRACT

A regulated power supply that provides two desired direct current voltages at respective outputs thereof, the supply maintaining the difference between voltages appearing at the outputs the same as the difference between the desired values, series regulators respectively coupled to each output that are in a saturation mode when a voltage that is a fraction of the voltage between the outputs lies within a given range, where one of the series regulators is placed in a linear mode when the voltage is at or beyond one edge of the range, and the other series regulators a linear mode when the voltage is at or beyond the other end of the range.

2 Claims, 1 Drawing Figure

REGULATED DC POWER SUPPLY

CROSS REFERENCE TO RELATED APPLICATION

This application is a continuation of application Ser. No. 732,485, filed May 9, 1985, now abandoned.

BACKGROUND OF THE INVENTION

Different regulated d.c. voltages have been provided by a power supply comprised of a transformer having its primary winding coupled to a power source of alternating current voltage and each of a plurality of secondary windings coupled to individual rectifying means. The d.c. voltage supplied by a main rectifying means, i.e. the one providing the greatest amount of power, may be regulated by controlling a pulse width modulator coupled to the primary winding, and the d.c. voltage of each of the other rectifying means, which are known as auxiliary rectifying means, is regulated by its own regulator that employs what is known as a post regulation technique. In one such technique a series regulator is used. It is comprised of an impedance through which the load current passes and means for increasing its value if the d.c. voltage goes above a desired value and for decreasing its value if the d.c. voltage goes below the desired value.

These variations can arise from changes in the load for the auxiliary rectifier, changes in the d.c. voltage provided by the power source or from changes in the width of the pulses applied to the primary winding as a result of the regulation of the main rectifying means.

In such a system the series regulators must be kept in the linear mode, i.e. they must always have at least a minimum impedance so that they can perform the regulatory function. Even if the minimum impedance could theoretically be reasonably small, it is generally considerably larger so as to ensure that regulation can occur under extreme conditions. Inasmuch as the impedance is generally resistive, the efficiency of the supply is reduced because of power dissipation occurring therein.

A particularly efficient type of series regulator is described in the proceedings of Powercon 9 for 1982 which are under a registered copyright of Power Concepts Inc. The article by Steven H. Pepper is at D-3, page 1 and is entitled "A New High Efficiency Post-Regulation Technique For Multiple Output Converters." This regulator is comprised of a current transformer having its low turn windings respectively connected in series with the load during alternating half cycles. Its secondary winding is coupled to a first diagonal of a rectifying bridge and the collector emitter path of a transistor is connected across the second diagonal. Direct current voltage at the output is compared with a reference voltage, and the results of the comparison are used to control the base electrode of the transistor. It acts as a variable clamp that effectively inserts a variable load across the second diagonal for different portions of cycles of the a.c. wave from the power source. The variation in load that is reflected to the primary is much smaller in size because of the high turns ratio between the secondary and primary windings and can be modeled as a voltage opposing that from the power source or as a resistor. The theoretical efficiency of such a regulator is about 98%, but in actual practice it is significantly less.

BRIEF DESCRIPTION OF THE INVENTION

In a power supply incorporating this invention a.c. voltage is applied to the primary winding of a transformer and rectifying means are coupled to each of two secondary windings so as to provide different d.c. voltages across their respective output capacitors. Means such as a pulse width modulator is provided for controlling the voltage wave applied to the primary winding so as to maintain the difference between the two voltages equal to the difference between their desired values. Thus, for example, if one output voltage is to be $+5.1$ v and the other $-5.3$ v the difference between them will be kept at 10.4 v regardless of the value of either. In addition each of the two voltages is regulated by a series regulator.

Means are provided for placing both series regulators in a saturated condition as long as a control voltage is within a given range, for placing only one series regulator in a linear mode so that it can regulate when the control voltage is beyond said range in one direction and for placing only the other series regulator in a linear mode so that it can regulate when the control voltage is beyond said range in the other direction. Operation in this way makes it possible to design the series regulators in such manner that there is no need for an extra voltage drop to occur across the regulator and reduce the efficiency.

BRIEF DESCRIPTION OF THE DRAWING

The drawing is a schematic illustration of a preferred embodiment of a power supply constructed in accordance with this invention, having positive and negative regulated d.c. voltage outputs.

DETAILED DESCRIPTION OF THE INVENTION

Figure 1:
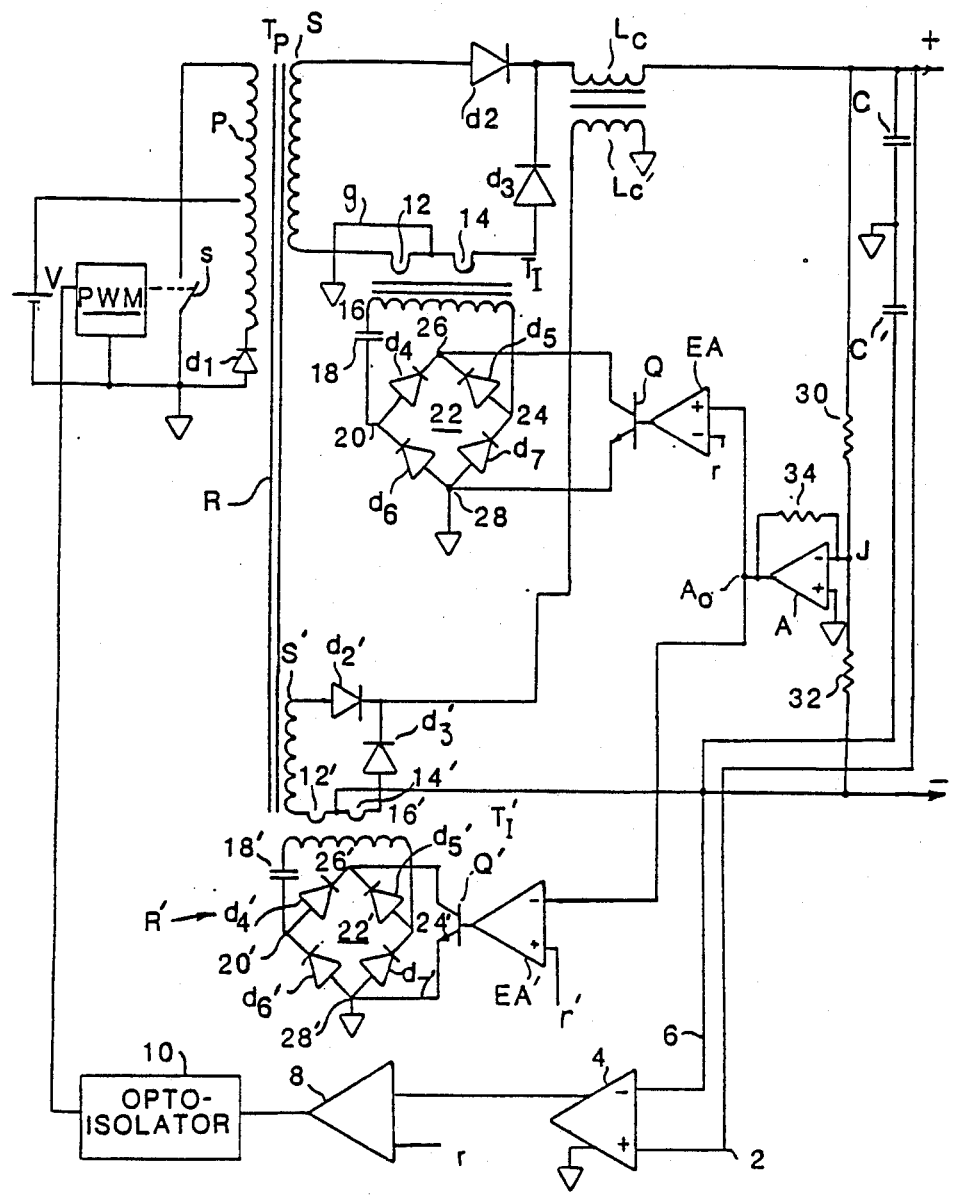

In the drawing one side of a source V of d.c. voltage is connected to a center tap on a primary winding P of a power transformer Tp and a grounded side of the source V is connected via a diode $d_1$ to one end of the primary P. The other end of the primary P is connected via a switch s to ground and a pulse width modulator control PWM contacts the switch s. A secondary winding S of the transformer Tp is coupled via rectifying means comprised of $d_2$ and $d_3$ and an inductor $L_c$ to the ungrounded side of an output capacitor C so as to produce a positive d.c. voltage across it. Another secondary winding S' of the transformer Tp is coupled via rectifying means comprised of $d_2'$ and $d_3'$ and an inductor $L_c'$ (that is coupled to $L_c$) to the grounded side of an output capacitor C' so as to produce a negative d.c. voltage across it. In a manner to be described subsequently these positive and negative d.c. voltages are preferably regulated by series regulators R and R'.

First, however, consider a means for keeping the difference between the voltages across capacitors C and C' at a predetermined value. A lead 2 is connected between the ungrounded side of capacitor C and a non-inverting input of a differential amplifier 4, and a lead 6 is connected between the ungrounded side of capacitor C' and the inverting input of the amplifier. A voltage corresponding to the difference between the d.c. voltage respectively across capacitors C and C' appears at the output of the amplifier 4 and is applied to one input of an operational amplifier 8. A reference voltage r equal to the difference between the desired voltages across capacitors C and C' is applied to the other input of the operational amplifier 8 and its output is coupled via an optoisolator 10 to control the pulse width modulator PWM.

The rectifying means including the diodes $d_2$ and $d_3$ that supplies the direct current voltage to the output capacitor C and its series regulator circuit R will now be described in detail.

One end of the secondary winding S of the power transformer Tp is connected to the anode of the diode $d_2$, and the coupled inductor $L_c$ is connected between the cathode of diode $d_2$ and one side of an output capacitor C, the other side of which is connected to ground.

The other end of the secondary winding S is connected via a primary winding comprised of series single turns 12 and 14 of a current transformer $T_I$ to the anode of the diode $d_3$, and its cathode is connected to the cathode of the diode $d_2$. The cathodes of diodes $d_2$ and $d_3$ are connected via the inductor $L_c$ to the ungrounded side of capacitor C'. A ground connection g is made to the junction of the windings 12 and 14, and for reasons to be explained inductor $L_c$ is magnetically coupled to an inductor $L_c'$.

As is customary in current transformers, the secondary winding 16 of transformer $T_I$ has many more turns than its primary windings 12, 14.

A capacitor 18 that is used to prevent saturation of the core of transformer $T_I$ is connected between one end of the secondary winding 16 and one end 20 of a diagonal of a bridge 22 comprised of diodes $d_4$, $d_5$, $d_6$ and $d_7$, and the other end 24 of that diagonal is connected to the other end of the secondary 16. Alternating current flowing in the primary windings 12, 14 of the current transformer $T_I$ causes a positive voltage to appear at one end 26 of the other diagonal of the bridge 22. The end 26 is connected to a collector of an NPN transistor Q, and the other end 28 of the diagonal is connected to ground and to the emitter of the transistor Q.

Variation of the voltage applied to the base of the transistor Q determines when the d.c. voltage across the diagonal 26, 28 will cause transistor Q to conduct during a cycle and will vary the resistance reflected into the primary windings 12, 14 of the transformer $T_I$, thereby affecting the value of the +d.c. voltage developed across the output capacitor C.

A second series regulator circuit, R', that is similar to the first is coupled to another secondary winding S' of the power transformer Tp. Components in this second series regulator circuit that correspond to the components of the regulator R have the same designations primed. In order to produce a negative output voltage, an output lead is connected from the junction of the primary windings 12', 14' to the ungrounded side of the output capacitor C'.

The amount of cross modulation is reduced for reasons described in an article by Walter Hirschberg entitled "Improving Multiple Output Converter Performance With Coupled Output Inductors" that appeared in the same Powercon 9, 1982 book of papers as previously noted, by magnetically coupling an inductor $L_c'$ to the inductor $L_c$ as previously noted. $L_c'$ is coupled between ground and the cathodes of the diodes $d_2'$ and $d_3'$. In addition to this function, the inductors $L_c$ and $L_c'$ respectively provide current in the primary windings 12, 14 and 12', 14' during the portion of a cycle when the anodes of $d_2$ and $d_2'$ are negative with respect to ground.

CONTROL OF THE SERIES REGULATOR

As described below, only one or the other of the series regulators R and R' can be in a linear mode at any given time but there are conditions where both will be in a saturation mode. A voltage divider comprised of resistors 30 and 32 that are connected in series between the ungrounded side of the output capacitor C and the ungrounded side of the capacitor C' produces at the junction J of the resistors 30, 32 a voltage between the voltages across capacitors C and C'. The junction J is connected to the inverting electrode of an operational amplifier A having its non-inverting electrode connected to ground so that the junction J is very close to ground. A resistor 34 is connected between the inverting electrode of the operational amplifier A and its output electrode. Thus the operational amplifier A has two inputs to its inverting electrode, one from the capacitor C, the gain for which equals the ratio of the value of the resistor 34 to the value of the resistor 30 and the other from the capacitor C', the gain for which is equal to the value of the resistor 34 to the value of the resistor 32.

In this particular circuit the output $A_o$ of the amplifier A is applied to the non-inverting electrode of an error amplifier EA and to the inverting electrode of an error amplifier EA'. The inverting input of EA is connected to a reference potential r, and the non-inverting input of EA' is connected to a reference potential r'. When the voltage at the output $A_o$ of the operational amplifier A is between r and r' both series regulators R and R' are placed in a saturation mode, and the voltages across capacitors C and C' are within an acceptable range of the desired value. This is brought about by selecting the values of the resistors 30, 32 and 34 and the values of the reference potentials r and r' so that the voltage at the output $A_o$ is midway between reference potentials r and r' when the voltages respectively across capacitors C and C' are precisely what is desired. Under this condition, transistors Q and Q' are biased to saturation so that the resistance reflected back to the primary circuits of the primary windings 12, 14 and 12', 14' is negligible. This means that the series impedances of regulators R and R' are so small that very little power is dissipated by the load current that passes through them.

Now if the voltages across capacitors C and C' change so as to cause the output voltage at $A_o$ to decrease to the reference voltage r, the series regulator R will be placed in a linear mode so that it can regulate and regulator R' will remain in saturation. Conversely, if the voltages across C and C' change so as to cause the voltage at $A_o$ to equal the reference r', regulator R' will be placed in a linear mode.

OVERALL OPERATION

Assume for example that the desired d.c. output voltages are +5.1 v and −5.3 v. These can be attained by making each of the resistors 30 and 32 equal 2K ohms, resistor 34 equal to 23.5K ohms and establishing the reference potential r at +2.2 v and the reference potential r' at +2.5 v. With these values, the voltage at output $A_o$ will be +2.35 v. The differential control means 4 and 8 that controls the pulse width modulator PWM will keep the difference between the output voltages equal to 10.4 v. Further assume that all these voltages exist and that the load potential to capacitor C drops so as to momentarily increase the voltage across capacitor C by Δv. The differential control means 4, 8 makes the voltage across capacitor C' equal to $-5.3+\Delta v$ so that its absolute value is reduced by $\Delta v$. If $2\Delta v \times 11.75$ (the gain of amplifier A) is $<|(r-r')/2|$, the series regulators R and R' will remain saturated, but if it is greater, the series regulators R and R' will remain saturated, but if it is greater, the series regulator R will be placed in the linear mode and will reduce the voltage to within $|(r-r')/2|/(2\times 11.75)$ volts of the original voltage across capacitor C. There is in effect a dead zone when the output $A_o$ is between reference potentials r and r' during which only the differential control means 4, 8 is operative. Although the output d.c. voltages across capacitors C and C' have opposite signs, they could have the same sign.

The circuit as a whole can be thought of as a ground seeking means in that it functions to bring the outputs into a given relationship with respect to ground.

Various combinations of the values of the resistors 30, 32, 34 and of the reference potentials r and r' as well as different connections of the various voltages to the input electrodes of the error amplifiers could be used if the desired output voltages were different. For example if the desired voltages are $+5$ v and $-5$ v, the output $A_o$ of the amplifier A will be at ground potential when these voltages actually exist and the resistances of the resistors 30 and 32 are the same, in which case the reference potential r could be $-0.15$ v and reference potential r' could be $+0.15$ v. Alternatively, the values of the resistors 30 and 32 could be made unequal so as to provide the $+2.35$ v at output $A_o$, in which event the reference voltages would remain at $+2.2$v and $+2.5$ v respectively. Whatever structure is provided, it must include means for placing one of the series regulators in a linear mode whenever one of the output voltages shifts from the desired value by a given amount in one direction from ground and means for placing the other series regulator in a linear mode whenever the other output voltage shifts from the desired value by the given amount in the other direction. Resistors 30 and 32 are means for providing a central signal at outputs $A_o$ that varies with the shift in the voltages across capacitors C and C'.

The fact that the operational amplifier A keeps the junction J practically at ground makes it a little difficult to understand the variations in the voltage at output $A_o$ in relation to variations in the voltages across capacitors C and C'. If we assume that there is an artificial voltage divider that is the same as that formed by the resistors 30, 32, the changes in the voltage at output $A_o$ would be inversely proportional to the changes in the output voltage of the artificial divider.

Whereas any series regulator could be used, the one illustrated is preferred because of its low loss. In the claims it will be referred to as a current transformer with variable load.

The differential control maintains the difference between the output voltage equal to the difference between the desired values and the series regulators maintain the desired relationship between the output voltages and ground.

What is claimed is:

1. A DC power supply comprising:
a transformer having a primary winding and first and second secondary windings,
means for exciting said primary winding with AC current,
means coupled to said first secondary winding for providing a first DC voltage,
means for regulating said first DC voltage,
means coupled to said second secondary winding for providing a second DC voltage,
means for regulating said second DC voltage,
means for deriving the difference between said first and second DC voltages, and
means responsive to said difference for controlling said means for exciting said primary winding so as to keep the difference at a predetermined value.

2. A DC power supply as set forth in claim 1 wherein:
said means for regulating said first DC voltage includes a first transistor that regulates when in a linear mode,
said means for regulating said second DC voltage includes a second transistor that regulates when in a linear mode,
means are provided for deriving a voltage intermediate said first and second DC voltages,
means responsive to said intermediate voltage for causing said first and second transistors to be in a saturation mode when said intermediate voltage is within a given range, for causing said first transistor to be in a linear mode and said second transistor to be in a saturation mode when said intermediate voltage is on one side of said range, and for causing said first transistor to be in a saturation mode and said second transistor to be in a linear mode when said intermediate voltage is on the other side of said range.

* * * * *

UNITED STATES PATENT AND TRADEMARK OFFICE
CERTIFICATE OF CORRECTION

PATENT NO. : 4,658,341
DATED : April 14, 1987
INVENTOR(S) : Jimmie D. Felps

It is certified that error appears in the above-identified patent and that said Letters Patent is hereby corrected as shown below:

Column 2, line 51, "coupled to $L_C$" should read
-- coupled to inductor $L_C$ --

Column 3, line 20, "C'" should read
-- C --

In the Abstract, line 11, "regulators a linear" should read
-- regulators is placed in a linear --

Signed and Sealed this

Twenty-first Day of November, 1989

Attest:

JEFFREY M. SAMUELS

Attesting Officer          Acting Commissioner of Patents and Trademarks